Dec. 2, 1952  H. E. HOPKINS ET AL  2,619,665
CABLE RETRACTOR FOR SEWER MACHINES
Filed June 10, 1948  2 SHEETS—SHEET 1

INVENTORS
Amos L. Jentz, and
Harold E. Hopkins
BY
Elroy J. Wutschel
Attorney

Dec. 2, 1952  H. E. HOPKINS ET AL  2,619,665
CABLE RETRACTOR FOR SEWER MACHINES
Filed June 10, 1948  2 SHEETS—SHEET 2
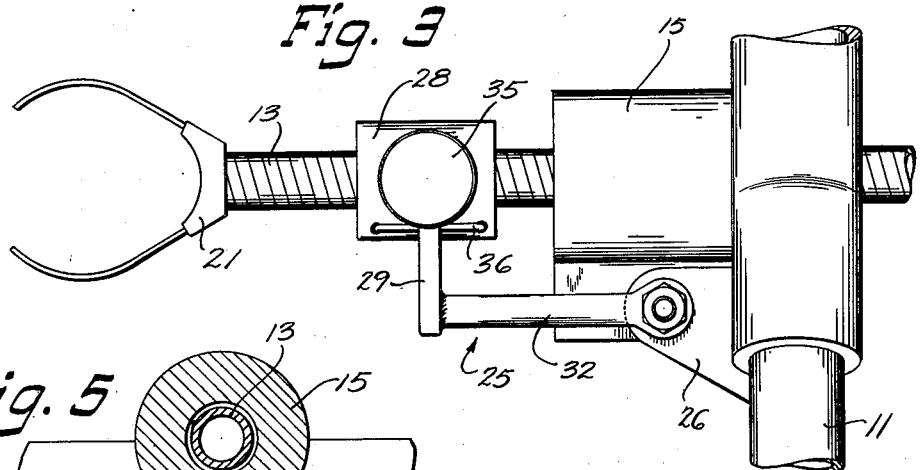
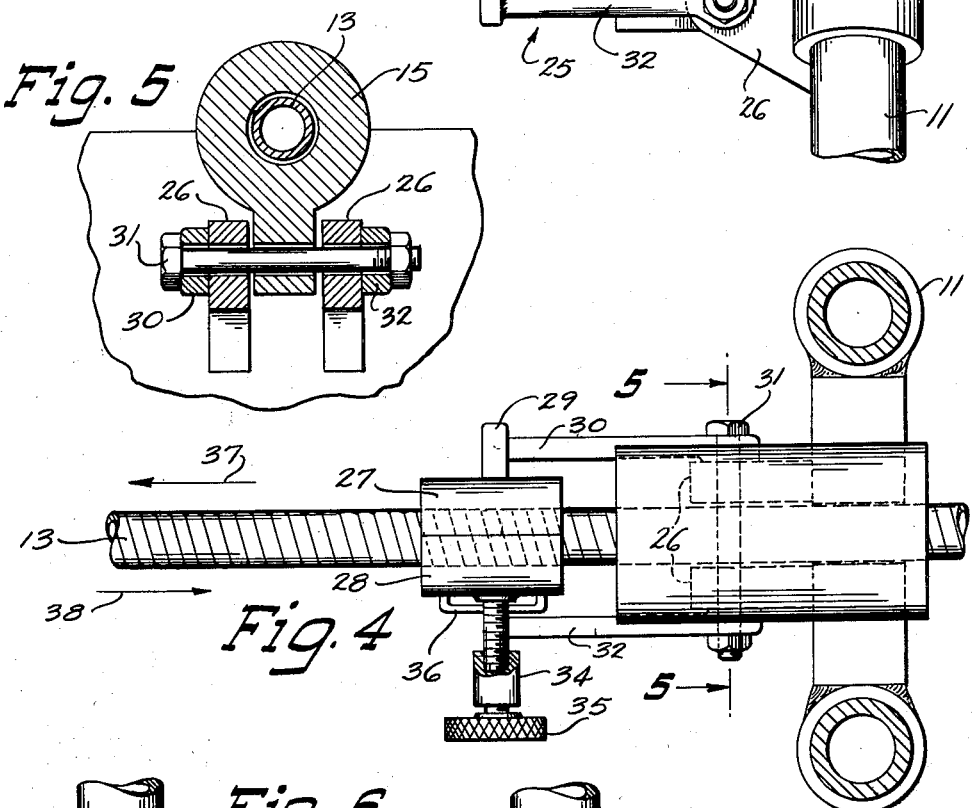
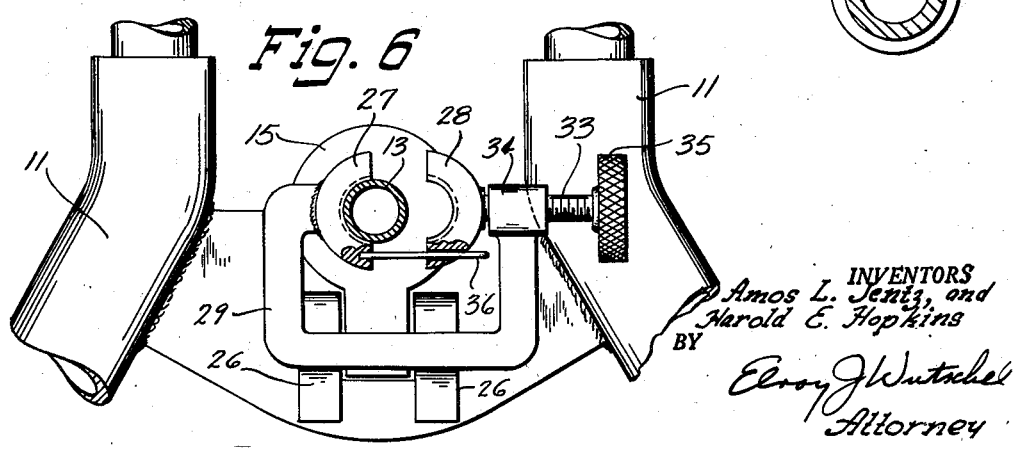
INVENTORS
Amos L. Jentz, and
Harold E. Hopkins
BY
Elroy J Wutschel
Attorney Patented Dec. 2, 1952

2,619,665

UNITED STATES PATENT OFFICE 2,619,665

CABLE RETRACTOR FOR SEWER MACHINES

Harold E. Hopkins and Amos L. Jentz, Milwaukee, Wis.

Application June 10, 1948, Serial No. 32,086

2 Claims. (Cl. 15—104.3)

This invention relates generally to sewer machines and more particularly to a cable retractor mechanism for such machines.

A general object of the invention is to provide a cable retractor for sewer machines.

Another object of the invention is to provide a cable retractor universally adaptable to any cable type sewer machine.

Another object of the invention is to provide a sewer machine cable retractor which operates to effect retraction of the extended cable and to feed it onto the retaining drum.

Another object of the invention is to provide a cable retractor for sewer machines which may be readily moved from an operative cable-engaging position when not in use.

Still another object of the invention is to provide a cable retractor for a sewer machine which serves to effect the expending of axial pressure to withdraw the cable and knife retaining chuck after they have become tightly wedged in a sewer pipe.

Still another object of the invention is to provide a cable retractor mechanism for a sewer machine which serves to effect a reversal in the direction of movement of the cable onto the drum without reversing the direction of rotation of the drum.

According to this invention, a novel cable retractor mechanism is provided which may be readily fitted to any of the standard sewer machines. The retractor mechanism is hingedly mounted on the frame of the machine to provide ready accessible operation and alignment. The retaining nut in the mechanism is split so that it can be easily fitted at any point in the entire length of the sewer cable. After it is raised to an operating position, the nut may be readily clamped to fit snugly around the cable. A guide on the two halves of the nut serves to retain them in alignment in an open or closed position. When the retractor mechanism is operatively applied to the cable, an axial withdrawing pressure is created thereon to effect its withdrawal from an open sewer pipe into which the cable had been previously fed.

The foregoing and other objects of the invention which will become more fully apparent from the following detailed specification may be achieved by means of the sewer machine cable retractor mechanism constituting an exemplifying embodiment of the invention that is depicted in and described in connection with the accompanying drawings in which:

Fig. 3 is an enlarged view of the cable retractor operatively positioned to retain the cable;

Fig. 4 is a top plan view of the cable retractor mechanism and mounting structure shown in Fig. 3;

Fig. 5 is a vertical view taken on the plane of the lines 5—5 in Fig. 4 showing the hinged mounting means for the retractor; and Fig. 6 is an end view of the cable retractor mechanism mounted on the machine with the split nut partially opened.

Figure 1:
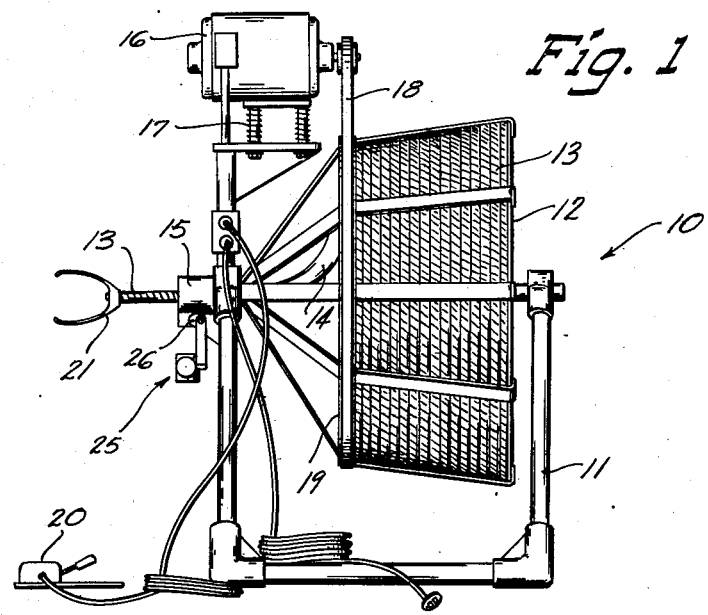
Figure 1 is a side view of a sewer cleaning machine showing the cable retractor mechanism attached thereto and disposed in a downward or inoperative position.
Figure 2:
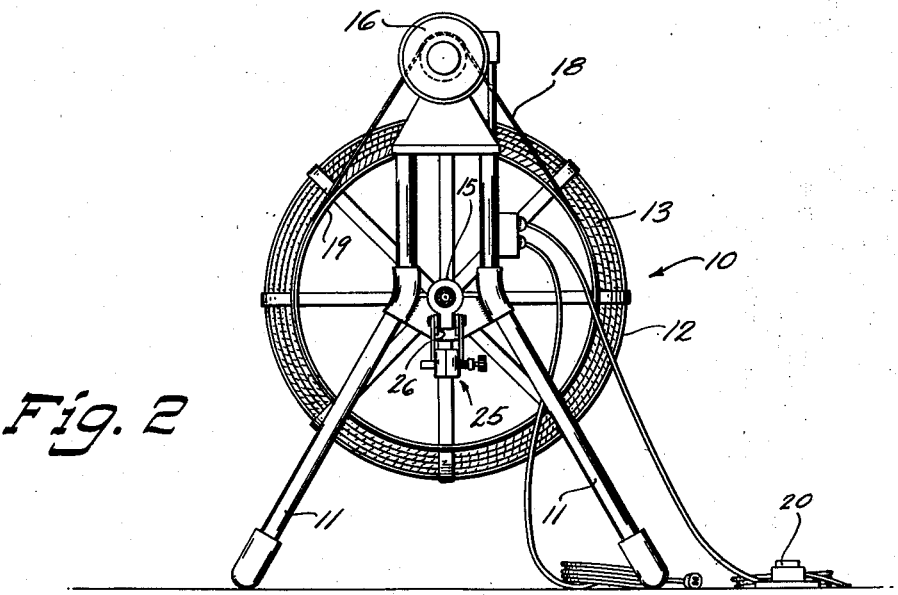
Fig. 2 is an end elevational view of the sewer machine shown in Fig. 1 with the cable retractor disposed in an inoperative position.

Referring more specifically to the drawings, Figs. 1 and 2 thereof show a portable electric sewer machine 10 of a standard type having a tubular frame 11 to support a cable retaining drum 12 rotatably mounted thereon. A comparatively long flexible cable 13 is internally coiled in the drum 12 and is fed from the drum by means of a distributor 14 rotatably journalled in the front bearing 15 supporting the drum 12. The bearing 15 is of the hollow type through which the flexible cable or snake 13 is extended and fed.

The drum 12 is power driven by means of a motor 16 mounted on the top of the tubular frame 11. A spring mounting 17 serves to protect the motor against shocks and overloads. The motor is power connected to drive the drum by means of a V-belt 18 operatively contained in a pulley 19 formed in the outer periphery of the drum 12. The operation of the motor is electrically controlled through a foot switch 20 which may be readily operated by the machine operator while he is feeding or retracting the cable.

Sewer machines serve to provide a means of cutting out and clearing obstructions in sewer pipes which would otherwise necessitate extensive digging and pipe renewal. The rotation of the drum 12 serves to effectively feed the cable outwardly from the drum via the distributor 14 through the center of the front bearing 15. A knife blade retaining chuck 21, as shown in Figs. 1 and 3, attached to the extending end of the cable 13 is fed into the end of an open sewer pipe in a well known manner. The rotation of the drum 12 serves to feed the cable from the drum and at the same time effect rotation of the cable and the knives retained in the chuck 21.

The knives rotate as the cable 13 is advanced through the sewer pipe and effectively cut any obstructions which may be in the pipe.

Heretofore machines of this type have been extremely practical to the extent of feeding the cable into the sewer pipe and effectively clearing the pipe of various debris generally found therein. However, it has been the experience of the inventors that the blade retaining chuck 21 often is forced to go around sharp corners or becomes stuck or locked within the pipe while the cable is advancing. When this occurs, further feeding action is stopped and the operator must manually withdraw the cable from the sewer pipe. Oftentimes the operator may find that he does not have enough strength to pull the cable out of the pipe and it is necessary to call for additional help. In some cases a tremendous amount of time is lost in extracting the cable in this manner and in some cases the knife blades are damaged or destroyed.

This difficulty is eliminated with the utilization of a cable retractor or reverser mechanism 25 which constitutes the subject matter of the invention. This mechanism may be readily attached to any of the standard types of sewer machines without necessitating any structural changes in the machine. The retractor mechanism 25 is hingedly attached to a pair of supporting lugs 26 constituting a portion of the tubular frame 11. As shown in Figs. 1 and 2, the mechanism 25 has been detached from the cable 13 and dropped into a downwardly inoperative position. It will be noted that in this position, the mechanism is out of the way and does not interfere with the normal operation of the cable. The mechanism is usually permitted to hang in this position during the normal operation of the machine. However, when the knife blades in the chuck 21 become stuck within the sewer pipe for any of the reasons aforementioned, the cable retractor may be readily swung into an operative position wherein it engages the cable and effects the retraction of the cable without changing the direction of rotation of the drum 12.

The cable used in this type of drum is of the well known wire wound type which is very strong and comparatively flexible so that it can readily conform to the pipe into which it is fed. The retractor mechanism 25 consists of a pair of longitudinally split nuts 27 and 28 as detailedly shown in Figs. 4 and 6. The nut portion 27 is fixedly mounted on a supporting arm 29 which is integrally formed with an extending arm 30. The arm 30, as shown in Fig. 4, extends rightwardly and is movably retained on one of the supporting lugs 26 by means of a bolt 31. This bolt also extends through the second lug and another arm 32 similar to the arm 30. The arm 32 is likewise integrally formed with the supporting arm or frame 29 in a manner to provide a very stable support for the retractor mechanism 25.

The movable portion 28 of the split nut is retained for sidewise movement on the end of a swivelably contained screw shaft 33. The shaft is threadedly retained in a stationary nut 34 integrally formed with the frame 29. The screw shaft 33 may be readily rotated by manually turning a knurled knob 35 fixedly mounted on the outer end of the shaft 33. The shaft and knob as shown in Figs. 4 and 6 are disposed for operation in the nut 34 and constitute a clamping means for operating the movable portion 28 of the split nut. When the retractor mechanism is to be removed from the operative position shown in Figs. 3 and 4, it is merely necessary to rotate the knob 35 until the clearance between the portions 27 and 28 is sufficient so that the cable 13 may be passed between them. Or, if the mechanism is to be rendered operative, it is merely necessary to rotate the knob 35 and shaft 33 in a clockwise direction to move the portion 28 leftwardly from the position shown in Fig. 6 into a closed position as shown in Fig. 4 wherein both of the portions of the split nut engage the cable 13. A guide means 36, as shown in Figs. 3, 4 and 6, fixedly retained in the stationary portion 27 of the nut and extending through the movable portion 28 serves to retain the two parts of the split nut in proper alignment so that they may be readily clamped to the cable 13. It is to be understood that any one of a number of guide means could be readily adapted for this purpose.

The power rotation of the drum 12 normally effects movement of the cable 13 outwardly and away from the machine, as indicated by the arrow 37 shown in Fig. 4, and at the same time effects rotation of the cable. However, when the retractor or reverser mechanism 25 is operatively disposed to engage the cable, as shown in Fig. 4, the threads contained in the two portions 27 and 28 of the split nut engage the coiled wire constituting the cable 13. Since the retractor mechanism 25 is rigidly mounted on the frame 11, and the rotation of the cable remains the same because the drum 12 is still rotating in the same direction, the direction of movement of the cable is of necessity changed, as indicated by the arrow 38 in Fig. 4. Thus the cable 13 is fed back into the drum 12 and appropriately coiled therein for further use. If the blades in the chuck 21 on the end of the cable have become stuck within the pipe, they will be easily withdrawn since the mechanical advantage gained by the application of the retractor mechanism to the cable is such that the driving mechanism of the sewer machine will not be overloaded.

One of the novel features of the retractor mechanism is that it may be readily applied to the cable at any point of travel. It is immaterial whether the cable has been fed but a few feet into the pipe or has been fed 75 or 80 feet. If it becomes stuck within the pipe it can be readily withdrawn merely by clamping the retractor mechanism to the cable. Since the cable 13 is wet when it is removed from the pipe, undue friction does not result as it rotates in the split nut. While we have shown the clamping mechanism for operating the movable portion of the split nut as a screw and nut mechanism, it is to be understood that we could readily utilize one of several types of mechanisms to effect movement of the nut portion from a clamped to an unclamped position or from an unclamped to a clamped position.

The cable retractor for sewer machines as described herein has great utility and may be readily adapted as a standard part of the machine or as an attachment thereto. The retractor mechanism insures easy retraction of the cable from a sewer pipe no matter how badly it has become stuck therein. Such retraction is effected with comparative ease with only one person present to operate the machine. During the retraction of the cable under power control through the use of the cable retractor 25, the rotating knives at the end of the cable are slowly withdrawn at an even rate of speed. Thus even though certain portions of the sewer pipe may have been skipped while the knives were advancing therein, the use of the cable retractor assures complete cleaning of the sewer while the cable is being withdrawn from the pipe under power as aforedescribed.

Although the foregoing description and the accompanying drawings have set forth the present invention in a single unit, it is to be understood that the structure shown and described is intended only to be illustrative of an operative form of the invention and that variations of the structure may be readily designed without departing from the spirit and scope of the invention as defined in the subjoined claims.

The principles of the invention having now been fully explained in connection with the exemplifying apparatus herein set forth, we hereby claim as our invention:

1. An attachment for a sewer cleaning machine of the power operated type having a rotary drum to retain the cable, said cable being disposed to be fed through a stationary hollow bearing member in axial alignment with the axis of said drum, said attachment comprising a collar member to encircle said cable adjacent said bearing member, a hinge pin mounted in said collar member in a plane transverse to the axial plane of said cable, a hinge member operably mounted on said hinge pin, a stationary half nut portion fixedly mounted on said hinge member, a movable half-nut portion adjustably mounted on said hinge member, a guide means to retain said movable nut portion in alignment with said stationary nut portion, a clamping means operatively retained to actuate said movable nut portion against said stationary nut portion, and a threaded helical center core extending through said nut portions to engage said cable when said nut portions are together and to release said cable when said clamping means is actuated to move said nut portions apart.

2. In a sewer cleaning machine, a frame, a power driven drum, a distributor operably mounted on said drum to carry said cable to and from said drum, a guide collar attached to said frame and disposed to support said cable from said distributor, a hinged member operably mounted on said collar, a stationary nut portion fixedly attached to said member, a movable nut portion adjustably mounted on said member for lateral movement relative to said stationary nut portion, a guide means anchored on said stationary nut portion and disposed to engage and retain said movable nut portion in alignment therewith, a threaded helical core centrally disposed through said nut portions substantially coaxial with the axis of said cable, and a clamping means selectively adjustable to position said nut portions to engage or disengage said cable whereby said hinged member can be tilted out of position when said nut portions are disengaged from said cable.

HAROLD E. HOPKINS.
AMOS L. JENTZ.

REFERENCES CITED

The following references are of record in the file of this patent:

UNITED STATES PATENTS

| Number | Name | Date |
| --- | --- | --- |
| 1,255,786 | Phillips | Feb. 5, 1918 |
| 2,037,103 | Yohn | Apr. 14, 1936 |
| 2,223,005 | Kerber | Nov. 26, 1940 |
| 2,267,493 | Klotz | Dec. 23, 1941 |
| 2,466,493 | Sketchley | Apr. 5, 1949 |
| 2,468,490 | Di Joseph | Apr. 26, 1949 |